United States Patent
Kite

(10) Patent No.: US 6,405,569 B1
(45) Date of Patent: Jun. 18, 2002

(54) THEFT PREVENTION LOCK FOR TRAILERS WITH SOCKET TYPE HITCHES

(76) Inventor: John H. Kite, 7130 Airline Dr., Urbandale, IA (US) 50322

( * ) Notice: Subject to any disclaimer, the term of this patent is extended or adjusted under 35 U.S.C. 154(b) by 0 days.

(21) Appl. No.: 09/614,460

(22) Filed: Jul. 11, 2000

(51) Int. Cl.$^7$ .............................. B60D 1/60; B60D 1/04
(52) U.S. Cl. ................... 70/14; 70/58; 70/158
(58) Field of Search ............................... 70/14, 18, 19, 70/58, 158, 159, 160, 163, 164, 166, 167, 237, 258

(56) References Cited

U.S. PATENT DOCUMENTS

| | | | | |
|---|---|---|---|---|
| 2,571,349 A | * | 10/1951 | Eckles | 280/33.17 |
| 4,141,569 A | | 2/1979 | Dilk | 280/507 |
| 4,792,151 A | * | 12/1988 | Feld | 280/406 |
| 4,903,978 A | * | 2/1990 | Schrum, III | 280/477 |
| 4,989,892 A | * | 2/1991 | Kerins et al. | 280/504 |
| 5,087,064 A | | 2/1992 | Guhlin | 280/507 |
| 5,433,468 A | | 7/1995 | Dixon | 280/507 |
| 5,603,178 A | * | 2/1997 | Morrison | 40/591 |
| 5,794,961 A | * | 8/1998 | Niswanger | 280/507 |
| 5,915,714 A | * | 6/1999 | Bell et al. | 280/456.1 |

* cited by examiner

Primary Examiner—Tan Nguyen
Assistant Examiner—Dalena Tran

(57) ABSTRACT

A theft prevention lock for trailers with socket-type hitches has a first plate element having a base portion and inner and outer ends. An upwardly extending arcuate protrusion is formed on the inner end of the first plate to penetrate the socket of a trailer hitch through an open bottom of the socket. An upwardly extending ear is on the outer end of the base portion and has a aperture therein. A second plate element has a lower end and an upper portion curving upwardly and terminating in a hook element with a lower arcuate portion complimentary in shape to the arcuate portion formed on the inner end of the first plate element. An aperture is in the second plate registering with the aperture in the ear of the first plate. The first and second plates are pivotally connected together. The shape of the first and second plates is such that when the apertures in the plate elements are in a registered position, a slot exists between the lower edge surface of the hook element and the outer edge surface of the arcuate protrusion on the inner end of the first plate. A U-shaped lock bar of a padlock is adapted to extend through the registered apertures in the first and second plates to receive a wall portion of a socket-type hitch.

8 Claims, 2 Drawing Sheets

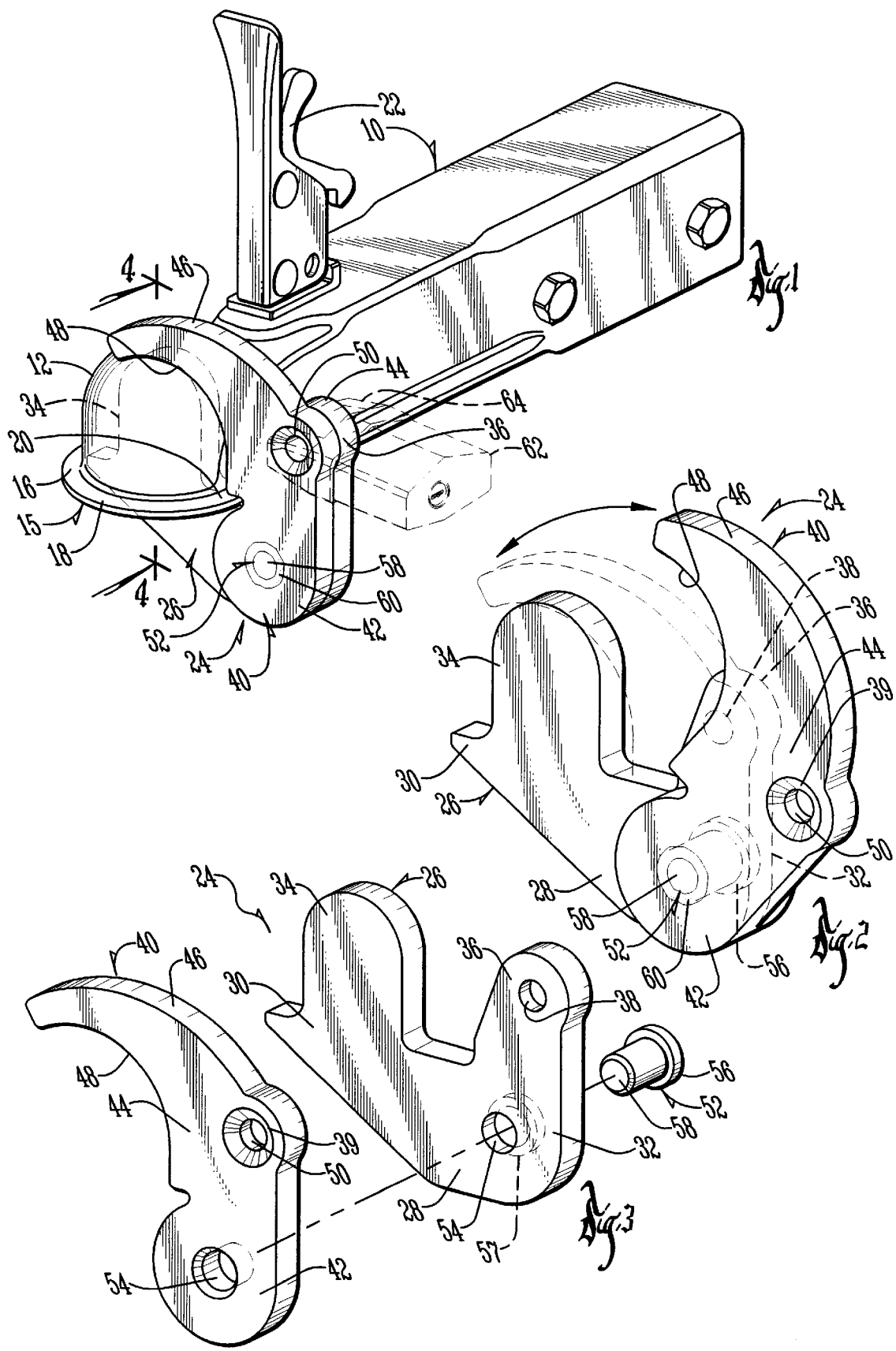

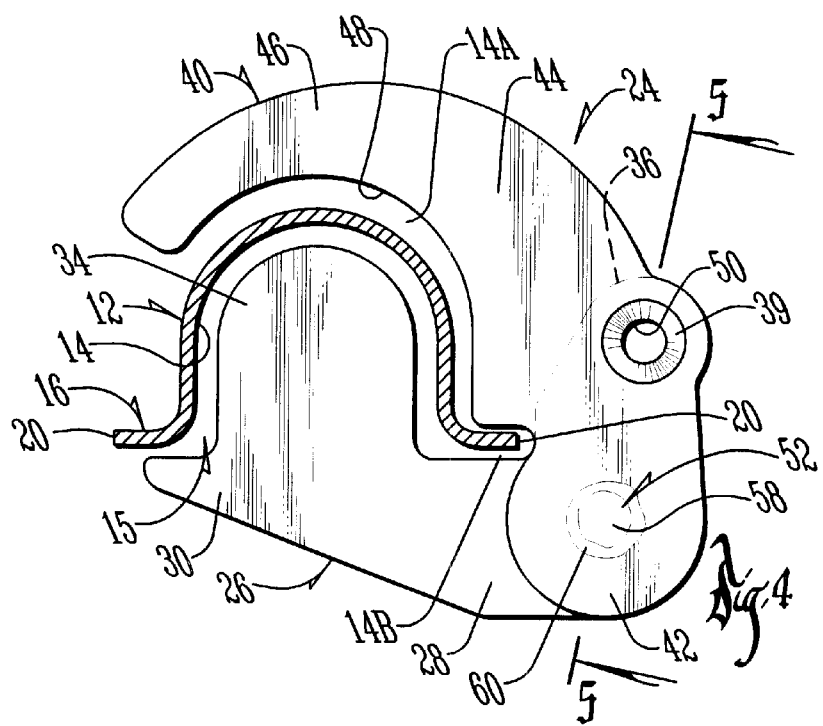
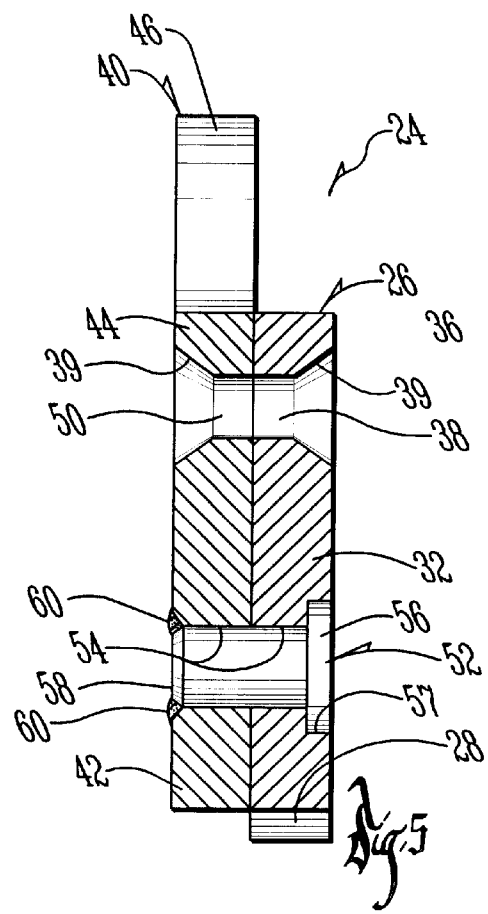

THEFT PREVENTION LOCK FOR TRAILERS WITH SOCKET TYPE HITCHES

BACKGROUND OF THE INVENTION

Unhitched trailers are highly susceptible to theft. This is because a thief can easily connect a trailer hitch to a pickup truck or the like, and pull the trailer away. Socket-type trailer hitches are particularly vulnerable wherein a ball connection on the rear of the thieves' truck rear bumper may be as compatible with the socket of the hitch as the ball on the trailer owner's truck.

It is therefore a principal object of this invention to provide a theft prevention lock for trailers with socket type hitches which will render the socket on the trailer hitch to be inoperative when the trailer is not being used.

A further object of the invention is to provide a theft prevention lock for trailers with socket type hitches which will interrupt the space within the socket of the trailer hitch to prevent any ball from being inserted into the socket until the mechanism is unlocked and removed by the trailer owner.

A still further object of this invention is to provide a theft prevention lock for trailers with socket type hitches which is easily installed and removed at the trailer owner's discretion.

These and other objects will be apparent to those skilled in the art.

SUMMARY OF THE INVENTION

A theft prevention lock for trailers with socket-type hitches has a first plate element having a base portion and inner and outer ends. An upwardly extending arcuate protrusion is formed on the inner end of the first plate to penetrate the socket of a trailer hitch through an open bottom of the socket. An upwardly extending ear is on the outer end of the base portion and has a aperture therein. A second plate element has a lower end and an upper portion curving upwardly and forwardly and terminating in a hook element with a lower arcuate portion complimentary in shape to the arcuate portion formed on the inner end of the first plate element. An aperture is in the second plate registering with the aperture in the ear of the first plate. The first and second plates are pivotally connected together by a pin in the outer ends thereof. The shape of the first and second plates is such that when the apertures in the plate elements are in a registered position, a slot exists between the lower edge surface of the hook element and the outer edge surface of the arcuate protrusion on the inner end of the first plate. A U-shaped lock bar of a padlock is adapted to extend through the registered apertures in the first and second plates.

BRIEF DESCRIPTION OF THE DRAWINGS

FIG. 1 is a perspective view of a trailer hitch in a locked condition by the device of this invention;

FIG. 2 is an enlarged scale perspective view of the lock of this invention in an unlocked condition;

FIG. 3 is an exploded perspective view of the parts of the device of FIG. 2;

FIG. 4 is a sectional view taken on line 4—4 of FIG. 1; and

FIG. 5 is an enlarged scale sectional view taken on line 5—5 of FIG. 4.

DESCRIPTION OF THE PREFERRED EMBODIMENT

FIG. 1 shows a conventional trailer tongue 10 with an arcuate socket 12 having a spherical compartment 14 and an open bottom 15 (FIG. 4). A horizontal flange 16 is located on the lower periphery of the socket 12 and extends around the open bottom 15 thereof. The flange has a forward edge 18 and side edges 20. A conventional lock mechanism 22 is mounted on tongue 10 and communicates with the interior portion of the socket 12 to lock the socket to a conventional towing ball (not shown) when the ball is inserted into the open bottom 15 of the compartment 14 for towing purposes. The structure described heretofore is all conventional and does not, per se, comprise the essence of this invention.

A theft prevention lock 24 and the parts thereof are best shown in FIGS. 2, 3, 4 and 5. The lock 24 includes a first flat plate element 26 having a base portion 28 (FIG. 3), an inner end 30, an outer end 32, and an upwardly extending arcuate portion 34. The shape of the portion 34 is complimentary in shape to the compartment 14 of the socket 12. See FIG. 4. Plate 26 has an upwardly extending ear 36 which has a horizontal aperture 38 extending therethrough. The outer end of the aperture 38 can have a beveled countersunk portion 39. (FIG. 5)

A second flat plate element 40 has a lower end 42, an upward portion 44, a hook element 46 with an arcuate lower portion 48 and an aperture 50 which is identical to aperture 38 in plate 26.

With reference to FIG. 5, a horizontal pin 52 extends into registering apertures 54 in plates 26 and 40 to provide a pivotal connection between the plates. The head 56 of pin 52 is received in a countersunk portion 57 in plate 26. The end of pin 52 opposite to head 56 can be slightly beveled to permit weldment 60 to rigidly secure the pin 52 to the plate 40.

With reference to FIG. 4, it should be noted that when the plates 26 and 40 are closed on each other, an arcuate slot 14A is created between the upper portion of protrusion 34 on plate 26 and the lower arcuate portion 48 of the hook element 46 of plate 40. Further, the inner end of slot 14A terminates in a horizontal slot segment 14B which receives a cross sectional portion of the horizontal flange 16.

A conventional padlock 62 with a U-shaped lock bar 64 extends through aperture 38 in plate 26 and aperture 50 in plate 40 when the apertures are in registering condition as in FIGS. 1, 4 and 5.

In operation, the assembled lock 24 of FIG. 2 is in its open condition, and the protrusion 34 is inserted upwardly into the open bottom 15 of the socket 12. The hook element 46 of plate 40 is then pivoted downwardly about pin 52 so that the socket 12 is sandwiched between the protrusion 34 on plate 26 (within the interior of the socket 12), and the lower arcuate portion 48 of hook element 46. As shown in FIG. 4, a portion of the cross sectional periphery of flange 16 is received within the slot segment 14B as best shown in FIG. 4.

With the plates 26 and 40 in the position of FIG. 4, the apertures 38 and 50 in the respective plates are in registering condition and permit the U-shaped lock bar 64 of padlock 62, when in its conventional open position, to be inserted through the apertures. The lock bar is then encapsulated conventionally within the padlock 62 to rigidly hold the plates 26 and 40 from pivoting with respect to each other.

The net effect of the foregoing assembly of the lock 24 with respect to the socket 12 is that the protruding portion 34 penetrates and encroaches on the space of the spherical compartment 14, thus absolutely preventing a conventional socket ball from being inserted into the socket 12. Thus, a thief who wishes to steal the trailer with the socket 12 on the tongue thereof, will find it impossible to place the socket 12 on the ball of his pick up truck, for example, and it will therefore not be possible for the thief to tow the trailer away.

Thus, from the foregoing, it is seen that this invention will achieve at least all of its stated objectives.

What is claimed is:

1. A theft prevention lock for trailers with socket-type hitches, comprising,
   a first plate element having a base portion and inner and outer ends,
   an upwardly extending arcuate protrusion formed on the inner end of the first plate to penetrate the socket of a trailer hitch through an open bottom of the socket,
   an upwardly extending ear on the outer end of the base portion, and having an aperture therein,
   a second plate element having a lower end and an upper portion curving upwardly and terminating in a hook element with a lower arcuate portion complimentary in shape to the arcuate protrusion formed on the inner end of the first plate element,
   an aperture in the second plate registering with the aperture in the ear of the first plate,
   the first and second plates being pivotally connected together,
   the shape of the first and second plates being such that when the apertures in the plate elements are in a registered position, a slot exists between a lower edge surface of the hook element and outer edge surface of the arcuate protrusion on the inner end of the first plate to receive a wall portion of a socket-type hitch;
   the theft prevention lock being free from any connection to a ball for insertion within a socket-type hitch.

2. A trailer hitch assembly in combination with the tongue of a trailer, comprising,
   a trailer hitch on the forward end of the trailer tongue and having an arcuate socket with an interior socket portion with an open bottom to receive a spherical ball mounted on a prime mover for towing the trailer,
   a theft prevention lock on the trailer hitch and including flat first and second plates pivotally secured to each other,
   an upwardly extending protrusion forming a part of the first plate and penetrating the interior socket portion,
   the second plate having a portion formed in the shape of an arcuate hook complimentary in shape to an upper outer surface of the socket with a portion of the socket being sandwiched between the protrusion on the first plate and the arcuate hook on the second plate,
   registering apertures in the first and second plates at a location exterior to the socket,
   a lock having a lock bar extending through the apertures to prevent any pivotal movement between the first and second plates to maintain the protrusion in the first plate from exiting the interior portion of the socket to prevent the insertion of a ball into the socket;
   the theft prevention lock being free from any connection to a ball for insertion into the socket.

3. The device of claim 1 wherein the protrusion on the first plate forms an arcuate slot portion with the arcuate hook to receive a portion of the socket.

4. The device of claim 3 wherein the slot portion is substantially parallel to a cross sectional portion of the socket.

5. The device of claim 4 wherein the shape of the protrusion on the first plate is complimentary to the shape of the arcuate hook to create the arcuate slot portion of a substantial uniform depth.

6. The device of claim 5 wherein the arcuate slot has an inner end terminating in a horizontal slot segment that receives a cross sectional portion of a horizontal flange that extends outwardly from the perimeter of the open bottom of the socket.

7. The device of claim 1 wherein the registering apertures are spaced from the pivotal connection between the plates.

8. The device of claim 1 wherein the plates are comprised of stainless steel.

* * * * *